(12) United States Patent
Barreyre et al.

(10) Patent No.: US 8,413,669 B2
(45) Date of Patent: Apr. 9, 2013

(54) HEATING SYSTEM FOR OUTDOOR CONVEYORS IN A CARWASH

(75) Inventors: Bernard G Barreyre, Burlington (CA); Trevor Campbell, Brooklin (CA)

(73) Assignee: Suncor Energy Inc., Calgary, Alberta (CA)

( * ) Notice: Subject to any disclaimer, the term of this patent is extended or adjusted under 35 U.S.C. 154(b) by 1283 days.

(21) Appl. No.: 11/761,250

(22) Filed: Jun. 11, 2007

(65) Prior Publication Data

US 2008/0121254 A1 May 29, 2008

Related U.S. Application Data

(60) Provisional application No. 60/867,128, filed on Nov. 23, 2006.

(51) Int. Cl.
*B08B 3/00* (2006.01)

(52) U.S. Cl.
USPC ......... 134/124; 198/339.1; 198/866; 198/952

(58) Field of Classification Search ............... 198/339.1, 198/866, 952; 134/124, 105
See application file for complete search history.

(56) References Cited

U.S. PATENT DOCUMENTS

| | | | |
|---|---|---|---|
| 1,484,071 A | | 2/1924 | Memmen et al. |
| 2,818,873 A * | | 1/1958 | Carlson et al. ................. 134/70 |
| 2,830,311 A * | | 4/1958 | Vizdos ........................... 15/53.3 |
| 3,121,437 A * | | 2/1964 | Tomchak ...................... 134/123 |
| 3,337,896 A * | | 8/1967 | Allen ............................... 15/302 |
| 3,599,650 A * | | 8/1971 | Abraham ....................... 134/123 |
| 3,808,698 A * | | 5/1974 | Peters ............................ 34/500 |
| 4,039,075 A * | | 8/1977 | Gray ............................ 198/746 |
| 4,924,996 A * | | 5/1990 | Svensson et al. ......... 198/341.05 |
| 4,981,151 A * | | 1/1991 | Larson et al. ................. 134/123 |
| 5,033,489 A * | | 7/1991 | Ferre et al. .................. 134/57 R |
| 5,261,251 A * | | 11/1993 | Galiyano ..................... 62/176.6 |
| 5,432,974 A * | | 7/1995 | Yasutake et al. ............. 15/316.1 |
| 5,542,603 A * | | 8/1996 | Macduff ......................... 237/69 |
| 5,544,453 A * | | 8/1996 | Engwall ....................... 52/169.5 |
| 5,579,996 A * | | 12/1996 | Fiedrich ......................... 237/69 |
| 5,730,061 A * | | 3/1998 | Stufflebeam .............. 104/172.3 |
| 5,803,098 A * | | 9/1998 | Decker ........................ 134/56 R |
| 5,901,398 A * | | 5/1999 | Ishikawa et al. ............... 15/53.3 |
| 5,957,378 A * | | 9/1999 | Fiedrich ......................... 237/69 |
| 6,082,125 A * | | 7/2000 | Savtchenko ................. 62/238.6 |
| 6,134,735 A * | | 10/2000 | Zamensky et al. ............. 15/53.1 |
| 6,233,951 B1 * | | 5/2001 | Cardill ............................. 62/81 |
| 6,270,016 B1 * | | 8/2001 | Fiedrich ......................... 237/69 |
| 6,296,697 B1 * | | 10/2001 | Stepanenko et al. .......... 106/604 |

(Continued)

OTHER PUBLICATIONS www.heaterplus.com/mats.htm; EasyHeat Sno-Melter Mats; downloaded Nov. 10, 2006.

(Continued)

*Primary Examiner* — Joseph A Dillon, Jr.
(74) *Attorney, Agent, or Firm* — Kilpatrick Townsend & Stockton LLP

(57) ABSTRACT

A system for heating conveyors which extend outside a wash tunnel of a carwash utilizes concrete structural slabs with heating apparatus embedded in the slab near a top surface and supported adjacent the conveyor. The heating apparatus can be a hydronic system or an electric heating mat embedded in the slabs which prevents water on the slabs or the conveyor from freezing in low ambient temperature conditions.

17 Claims, 19 Drawing Sheets

U.S. PATENT DOCUMENTS

| | | | |
|---|---|---|---|
| 6,325,863 B1 * | 12/2001 | Zamensky et al. | 134/18 |
| 6,372,053 B1 * | 4/2002 | Belanger et al. | 134/34 |
| 6,543,471 B1 * | 4/2003 | Carroll | 137/312 |
| 7,032,398 B2 * | 4/2006 | Dilk et al. | 62/235 |
| 7,032,649 B2 * | 4/2006 | Schulak et al. | 165/45 |
| 7,231,775 B2 * | 6/2007 | Dilk et al. | 62/235 |
| 7,258,125 B2 * | 8/2007 | Holbrook | 134/113 |
| 7,278,533 B2 * | 10/2007 | Horn | 198/817 |
| 7,337,791 B1 * | 3/2008 | Belanger et al. | 134/56 R |
| RE40,463 E * | 8/2008 | Belanger et al. | 134/34 |
| 7,438,075 B1 * | 10/2008 | Huntington et al. | 134/57 R |
| 2005/0210620 A1 * | 9/2005 | VanOrden et al. | 15/319 |
| 2006/0060661 A1 * | 3/2006 | Bourgault et al. | 237/2 A |
| 2006/0191773 A1 | 8/2006 | Horn | |
| 2007/0246088 A1 * | 10/2007 | Rennie | 134/123 |
| 2008/0308133 A1 * | 12/2008 | Grubb et al. | 134/72 |
| 2009/0272371 A1 * | 11/2009 | Nothum, Jr. | 126/19 R |
| 2009/0272409 A1 * | 11/2009 | Petit | 134/32 |
| 2010/0018228 A1 * | 1/2010 | Flammang et al. | 62/115 |
| 2010/0294621 A1 * | 11/2010 | Kolios | 198/464.1 |

OTHER PUBLICATIONS www.aplussupply.com/easyheat/snowmat.htm; EasyHeat Snow Melting; downloaded Nov. 10, 2006.

* cited by examiner

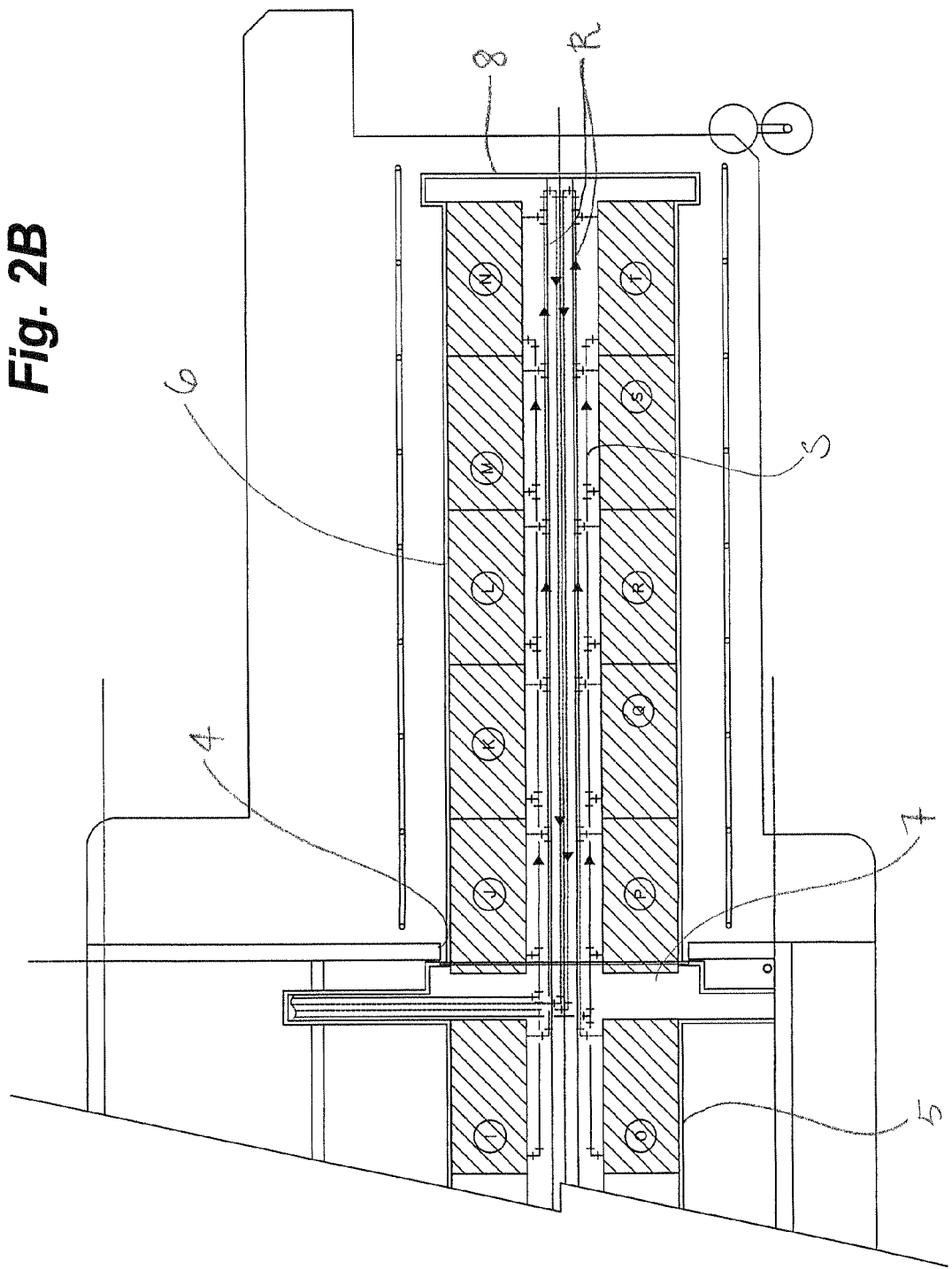

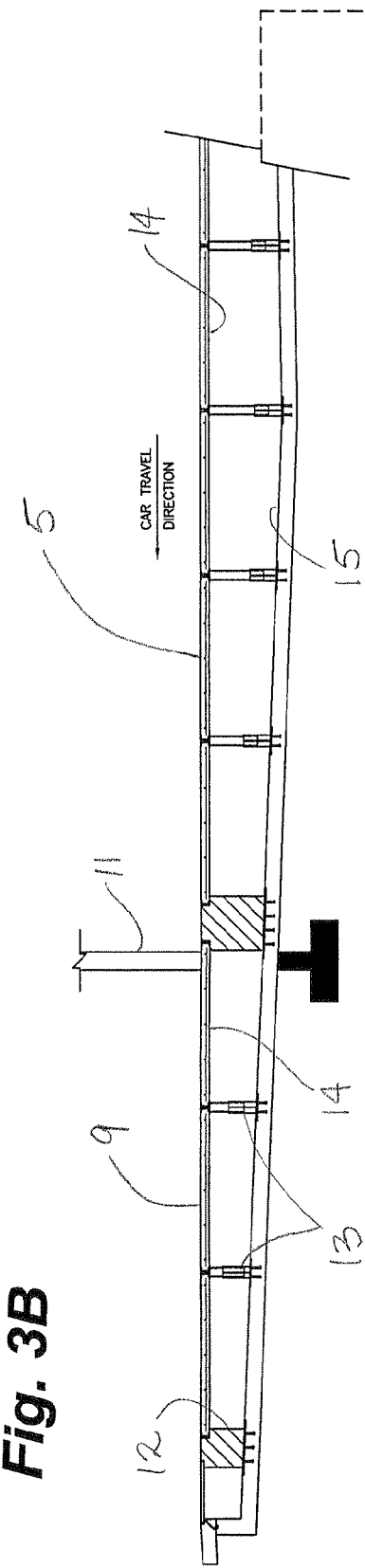
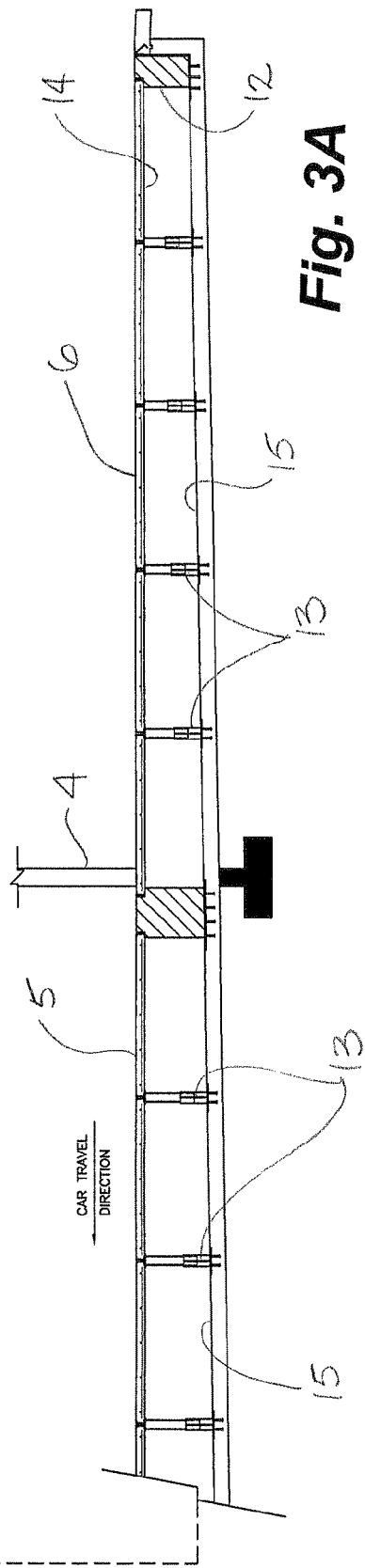
Fig. 3B
Fig. 3A

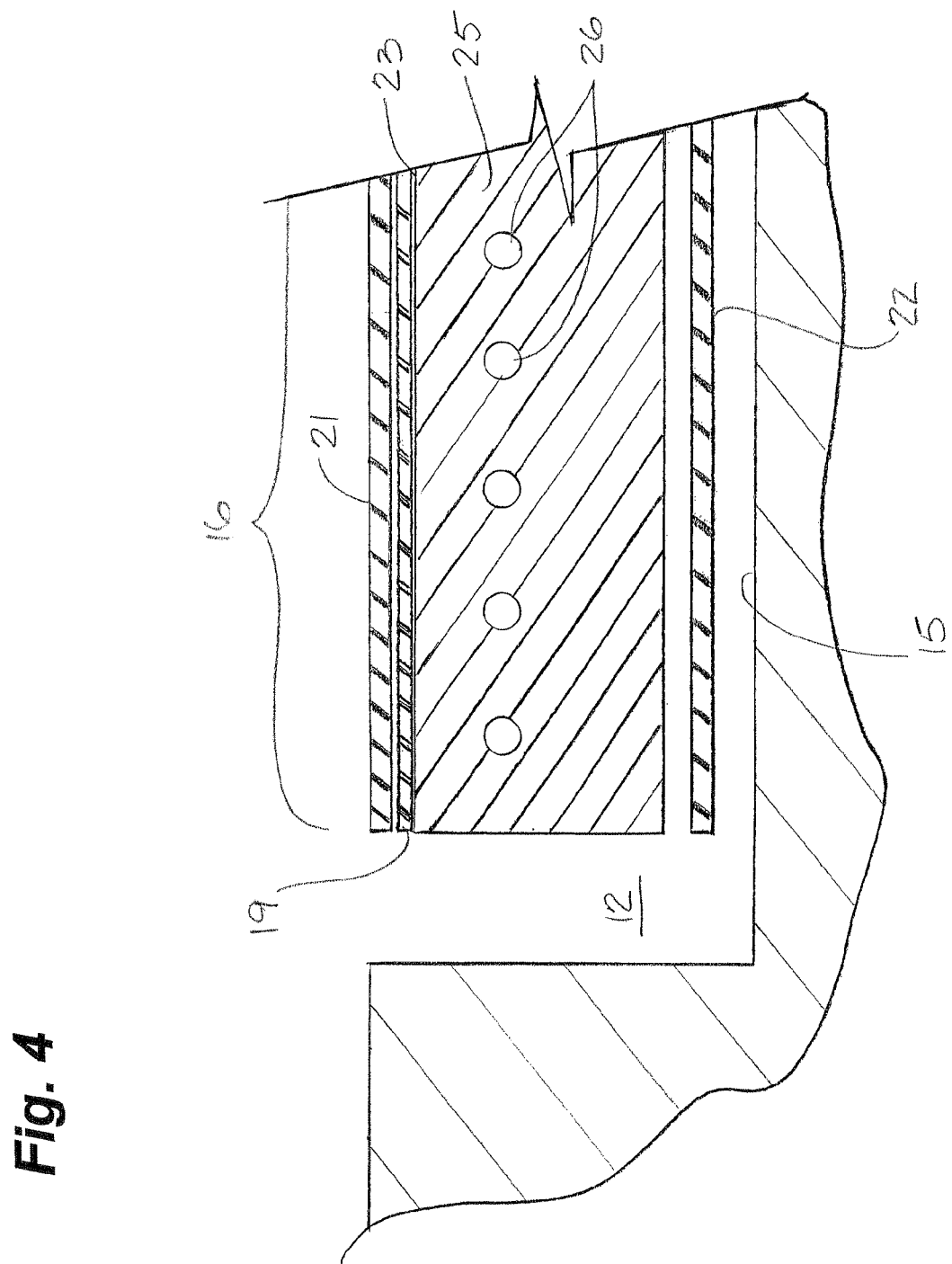

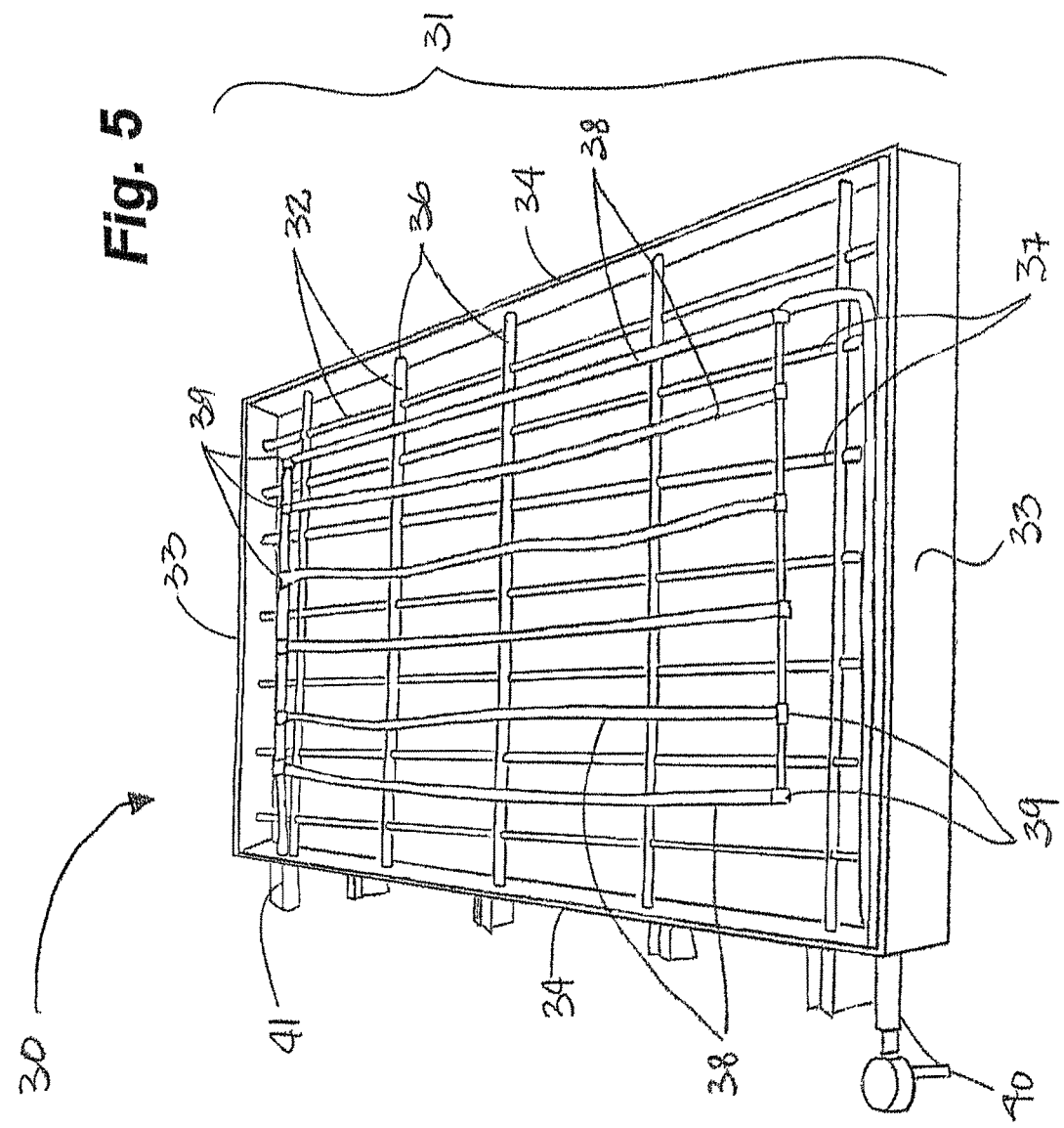

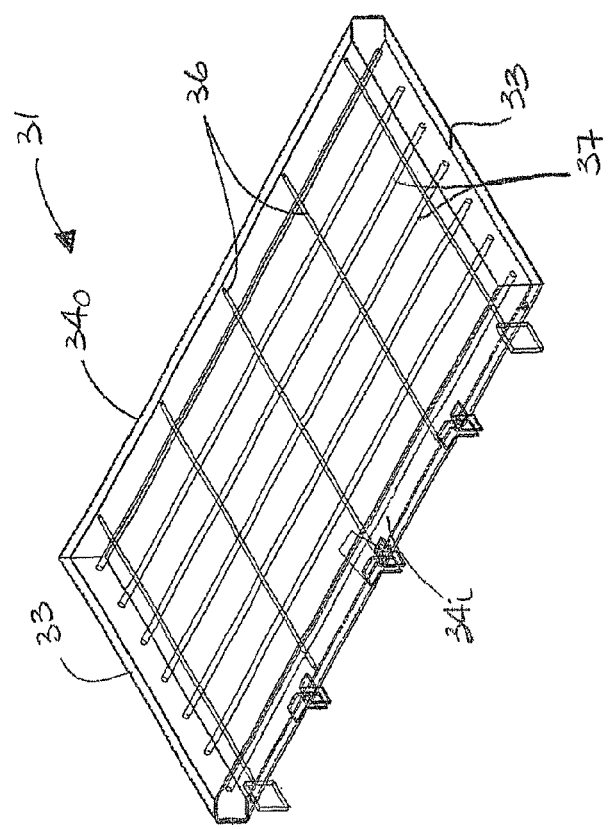
*Fig. 7a*
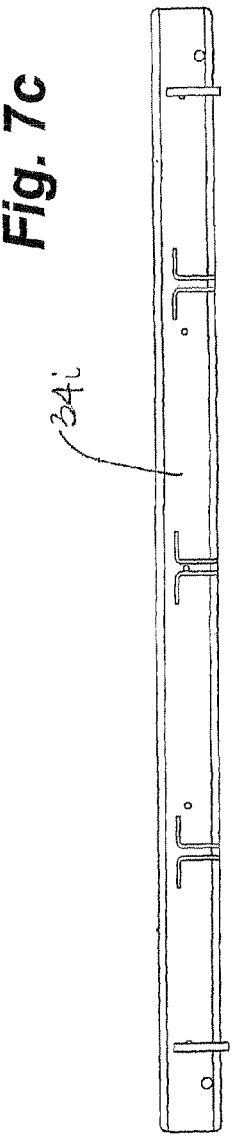
*Fig. 7c*
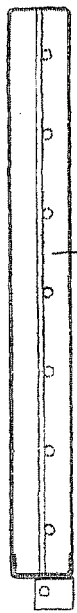
*Fig. 7b*

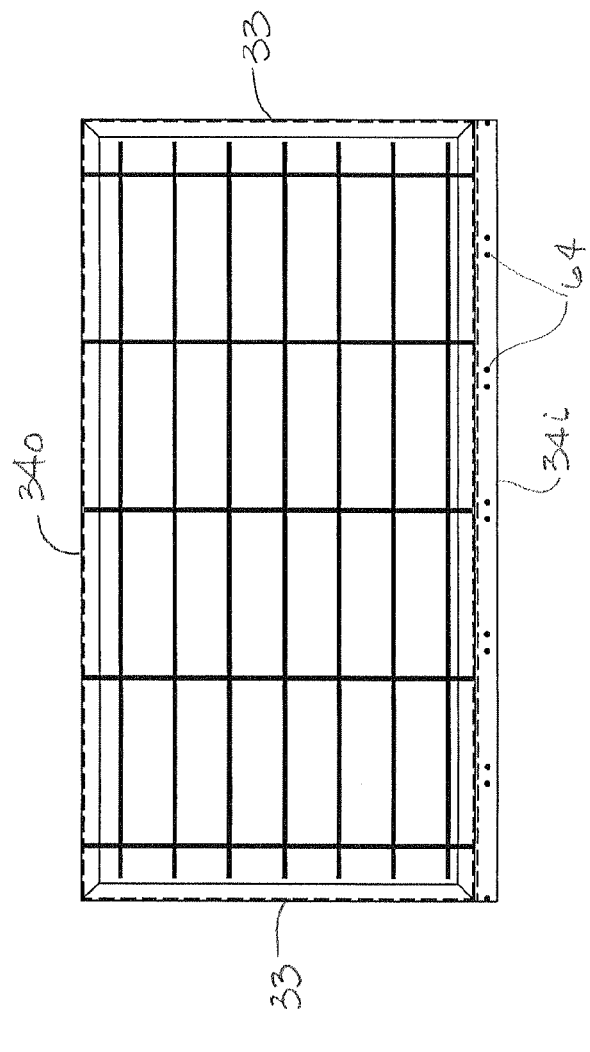
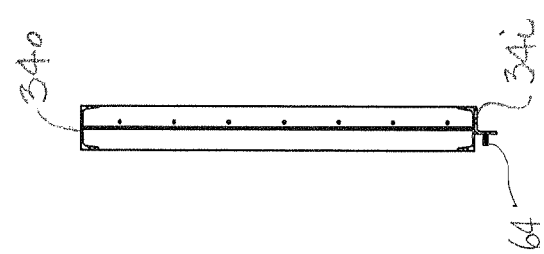
Fig. 15A
Fig. 15B
Fig. 15C

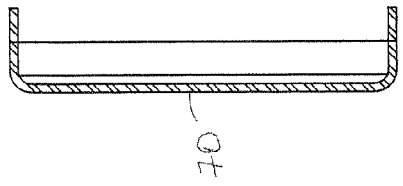
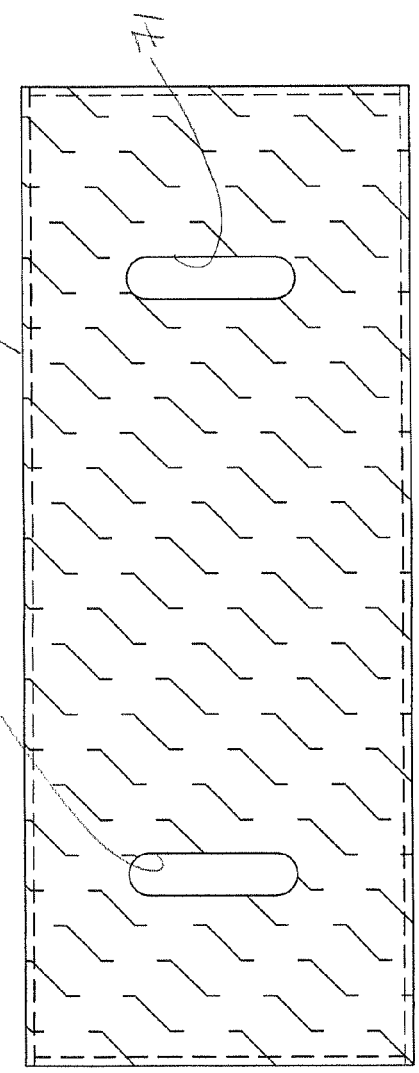
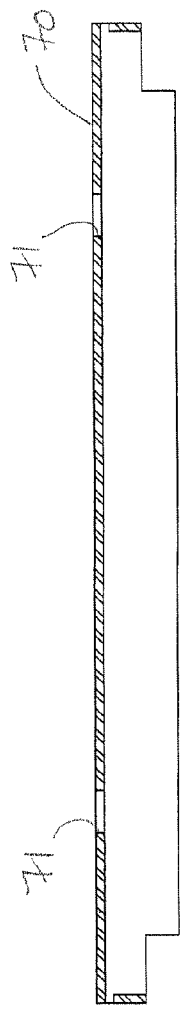

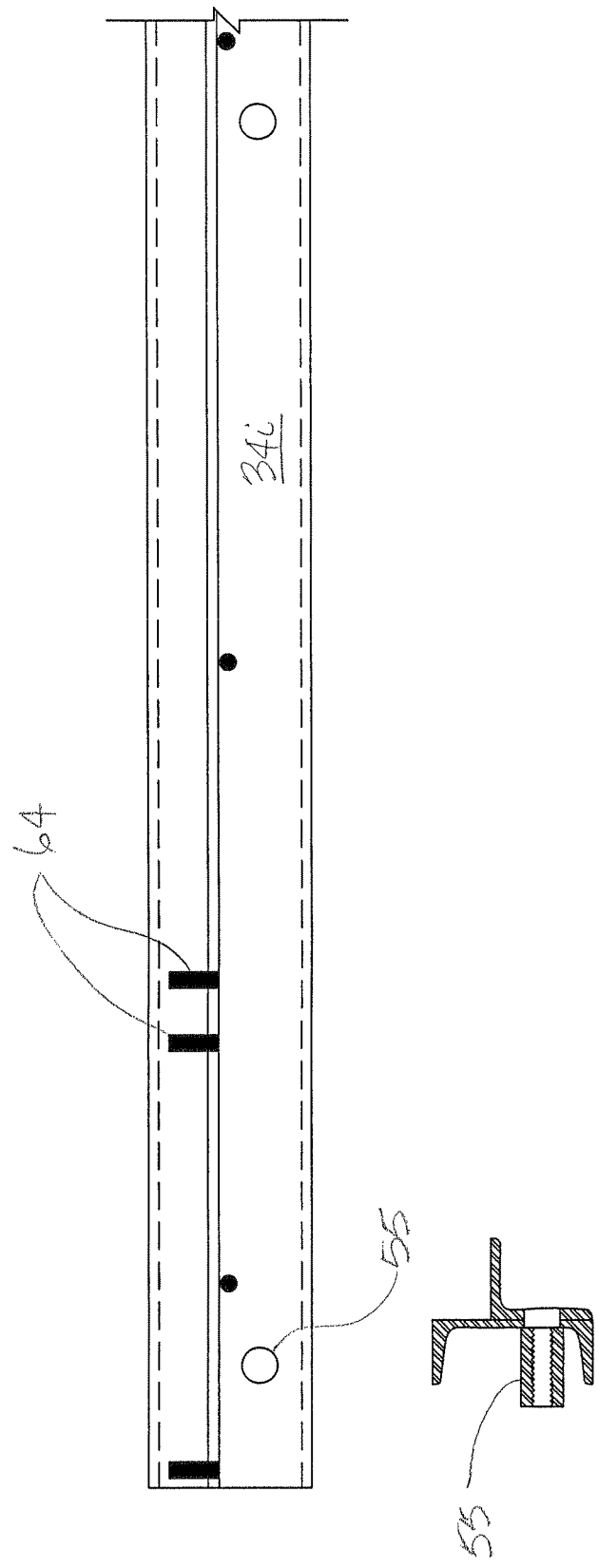

HEATING SYSTEM FOR OUTDOOR CONVEYORS IN A CARWASH

CROSS REFERENCE TO RELATED APPLICATION

This application is a regular application claiming priority of U.S. provisional application Ser. No. 60/867,128, filed Nov. 23, 2006, the entirety of which is incorporated herein by reference.

FIELD OF THE INVENTION

Embodiments of the invention related to systems for heating surfaces and more specifically to heating the sliding surfaces of a carwash conveyor in a wet and potentially freezing environment.

BACKGROUND OF THE INVENTION

It is known to provide one or more conveyors for movement of objects from one place to another. There are many different types and configurations of conveyors which have been known for decades. Conveyors are used in a wide variety of contexts including, but not limited to, manufacturing, transport and loading of objects. Many conventional conveyors operate in relatively controlled environments and thus are not exposed to ambient temperatures which may be below freezing temperatures in combination with high levels of moisture.

The conveyors may be single endless-belt type conveyors or side by side synchronous endless belts which engage the object at opposing points or in some cases are synchronous sections of conveyors, single or dual belt type, which feed from one to another.

In the case of a carwash, it is known to provide means for moving a vehicle through a wash tunnel. Typically, the vehicle enters an entrance of the tunnel where the vehicle is engaged by a below ground conveyor and guide track having means for engaging at least a single wheel of the vehicle, the vehicle being advanced through the wash by the conveyor, the entirety of the conveying system being enclosed in the wash tunnel where water used to wash the vehicles and heated air prevents the conveying mechanism from freezing during the winter.

U.S. Pat. No. 1,484,071 to Memmen teaches a dual belt conveyor for forming runways for the wheels of an automobile to be washed. The conveyor assists in lowering the vehicle into a tank or vat and further assists in agitating the water to wash the undercarriage as the endless belts of the conveyors and the wheels of the vehicle are caused to move.

Recently, published US patent application 200601918773 to Horn describes one or more conventional dual-synchronous belt type conveyors for use in a carwash. The conveyors each have a pair of spaced apart belts such as is well know in the art and the belts support the wheels of the vehicle. A first conveyor is stopped to accept the vehicle and can be sped up to a speed synchronous with the main conveyor which, when the vehicle is transferred from the first conveyor to the main conveyor, moves the vehicle through the wash tunnel. Synchronizing of conveyor belts, single or dual belt types, is well known in a variety of industries. Horn is silent regarding use of the conveyors outside the carwash and at low ambient temperatures.

A need still exists within the industry to provide conveyor systems capable of being exposed to the environment outside the wash tunnel while maintaining operability in very low ambient temperatures.

SUMMARY OF THE INVENTION

Embodiments of the invention teach a carwash reliably operable in all seasons and particularly suited for installation in cold weather climates wherein the carwash provides at least one conveyance system which extends outside a wash tunnel for loading vehicles outside the wash tunnel, the conveyance system being heated for preventing freezing in extreme cold weather conditions.

More particularly embodiments of the invention teach a heating system for a carwash conveyance system comprising a plurality of heated concrete slabs which are installed in proximity to the conveyance system for preventing freezing during extreme cold weather conditions.

In one broad aspect of the invention, a system for heating a conveyor for supporting a vehicle for movement through a car wash exposed to low ambient temperatures comprises: at least one conveyor adapted for moving the vehicle through the carwash, at least a portion of the conveyor being exposed to the low ambient temperatures; and one or more heated structural slabs supporting at least a portion of the at least one conveyor for transferring heat for preventing fluid at the conveyor from freezing.

In one embodiment the conveyor comprises spaced parallel endless belts, such as plastic modular belts, steel slat belts or other suitable belts, the belts being spaced laterally so as to support the wheels on each side of a vehicle on each of the belts. Concrete structural slabs, heated and unheated, sufficiently strong to support the weight of the vehicle being moved thereon, are supported in spaced parallel arrangement under each of the belts. The supporting substructure is designed to suspend the slabs above the floor of a trench in a carwash.

BRIEF DESCRIPTION OF THE DRAWINGS

FIG. 2B is a plan view of an entrance conveyor according to an embodiment of the invention;

FIGS. 3A and 3B are partial longitudinal sectional views according to FIG. 1, more particularly FIG. 3A illustrates an entrance conveyor extending outwards from an entrance of wash tunnel and a portion of a main conveyor housed in the wash tunnel; and FIG. 3B illustrates a portion of the main conveyor and an exit conveyor extending outwards from an exit of the wash tunnel;

FIG. 4 is a cross-sectional schematic view of a heated concrete slab and a conveyor belt installed thereabout;

FIG. 5 is a perspective view of a frame and heating system for heating the conveyor according to an embodiment of the invention;

FIG. 7A is a perspective view according to FIG. 5;

FIG. 7B is and end view according to FIG. 5;

FIG. 7C is an edge view along lines C-C according to FIG. 7B;

FIGS. 12-18B illustrate details of a support system for suspending heated and non-heated concrete slabs and gratings over the floor of a carwash and more particularly in a trench extending through and outwards from the wash tunnel at the entrance and the exit thereof, more particularly FIG. 12 is an end sectional view of a trench in a car wash illustrating a central open grating supported above a floor therein between concrete structural slabs;

FIG. 13 is a detailed sectional view of a supporting structure for supporting T-shaped transverse channels and end channels of the structural slabs from the side wall of the trench;

FIG. 14 is a side view of adjacent structural slabs a T-shaped transversely extending channel supporting end channels of the adjacent slabs;

FIGS. 15A-15C illustrate a typical structural panel shown in plan, side and end views;

FIGS. 16A-16C illustrate a checker plate used to replace gratings to cover the trench between the parallel spaced structural slabs exterior to the car wash tunnel, shown in plan, side and end views;

FIG. 17 is a plan view of a typical grating used to cover the trench between the parallel spaced structural slabs; and FIG. 18A is a side view of a slab according to FIG. 9 illustrating an electrical conduit for housing electrical connections therein; and FIG. 18B is a detailed view of the electrical conduit of FIG. 18A.

DETAILED DESCRIPTION OF THE PREFERRED EMBODIMENT

Embodiments of the invention disclosed herein heat a conveyor for moving a vehicle through a wash tunnel of a carwash. The use of the term "conveyor" is intended to describe any suitable type conveyance system for moving the vehicles therethrough and is not intended to be limited only to the embodiment of conveyor discussed herein.

Figure 1:
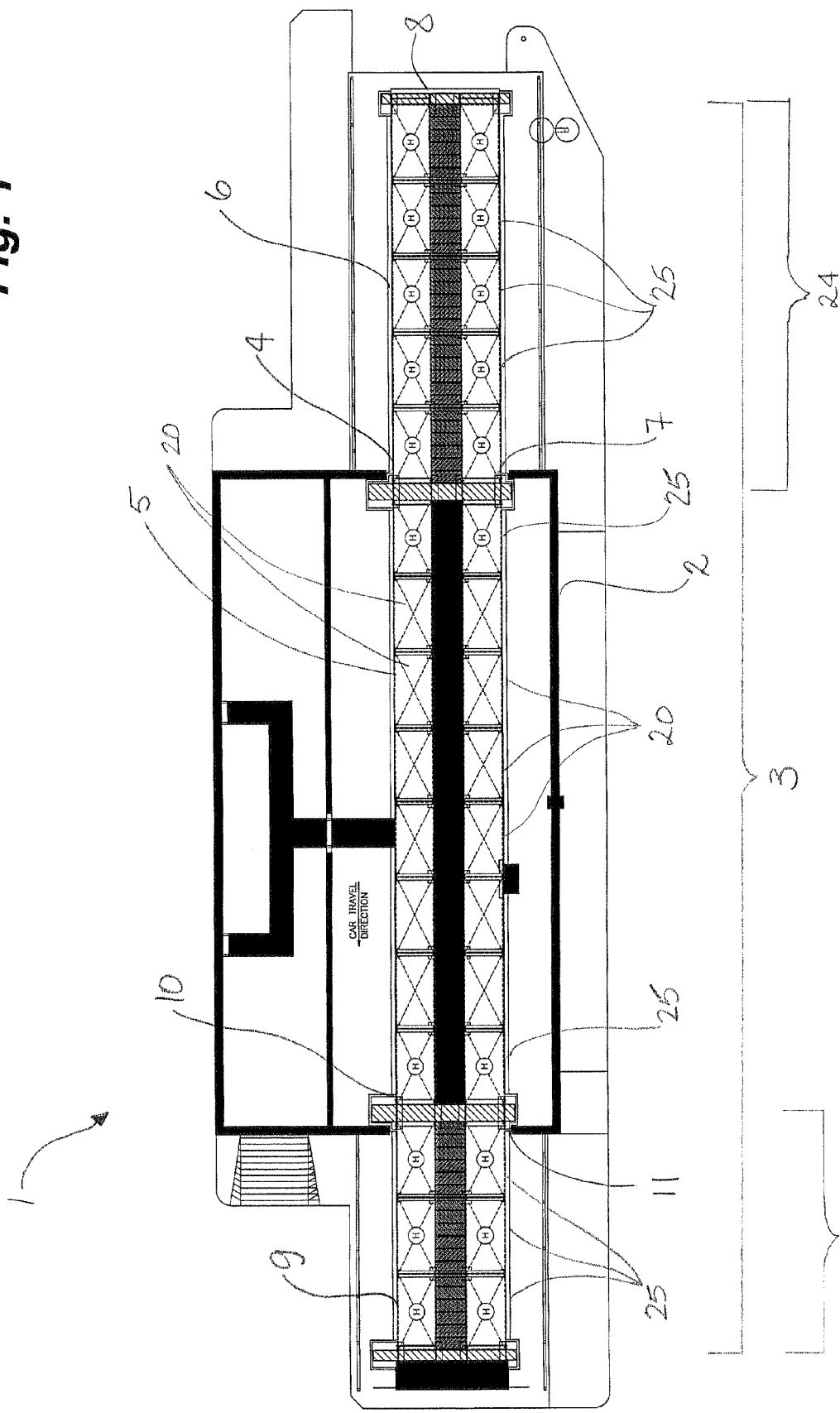
FIG. 1 is a plan view of a conveyor system according to an embodiment of the invention.
Figure 2A:
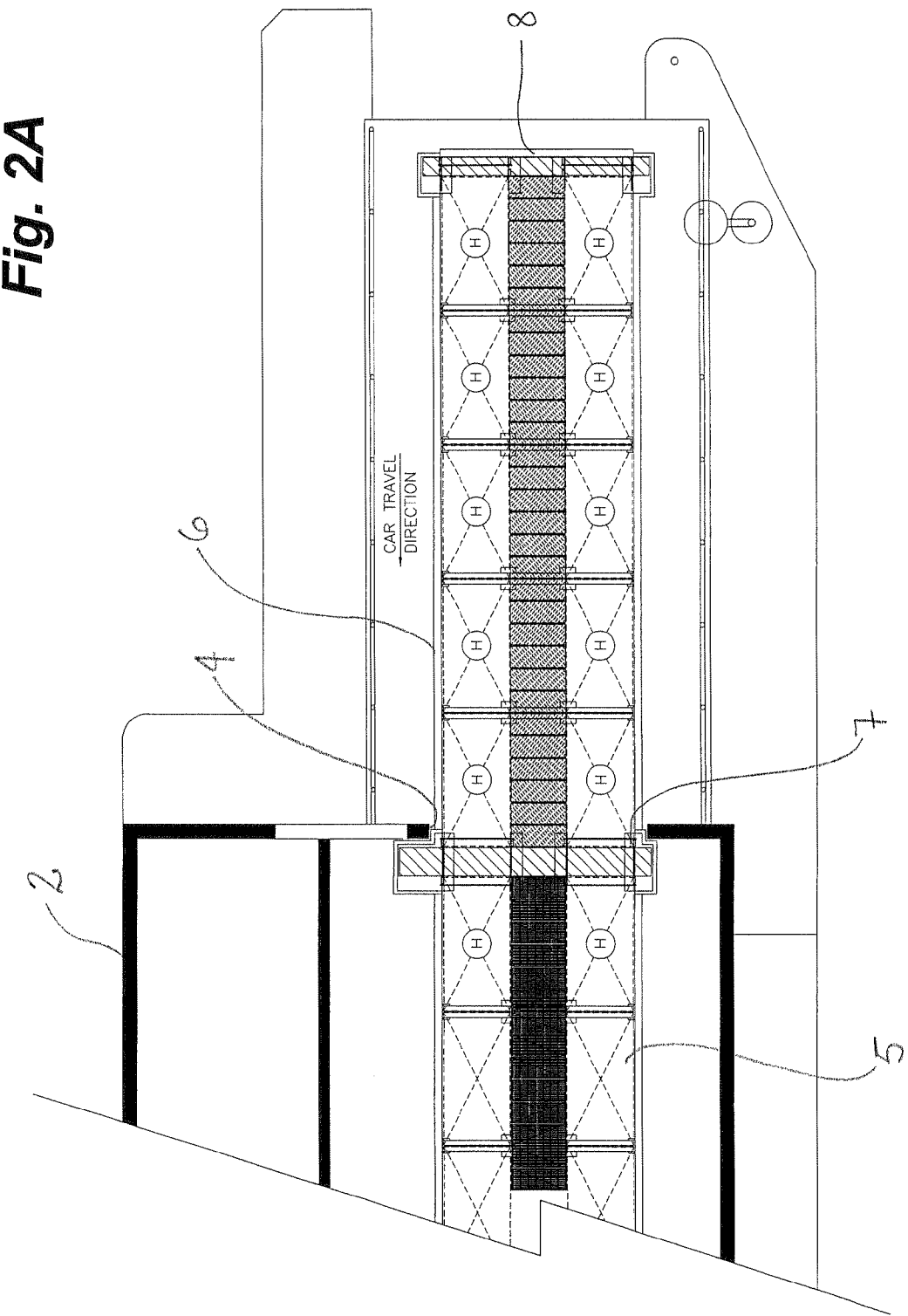
FIG. 2A is a plan view of an entrance conveyor according to FIG. 1.
Figure 6:
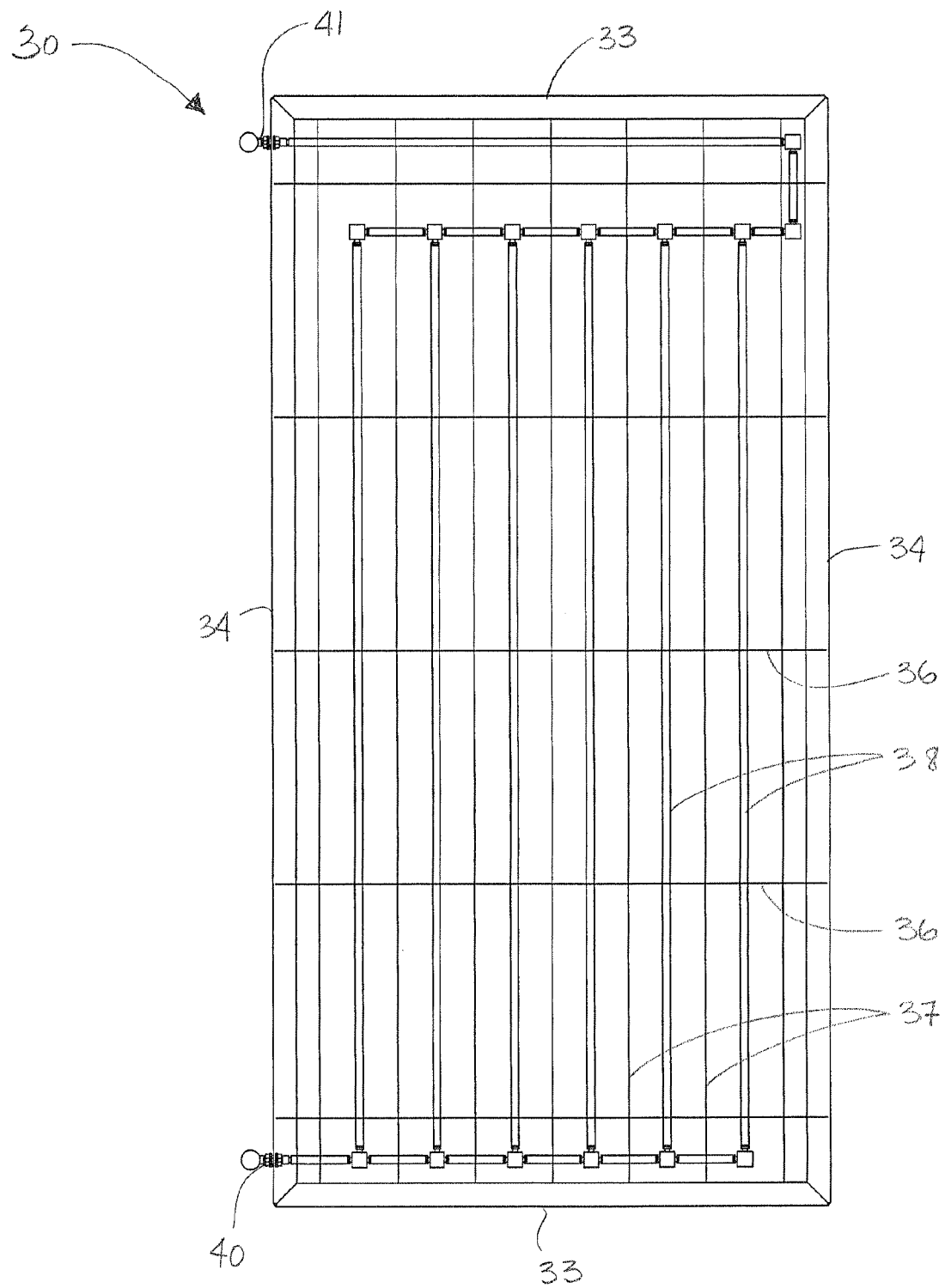
FIG. 6 is a plan view of a frame and a hydronic system for heating a heated concrete slab for use according to FIG. 4.
Figure 8:
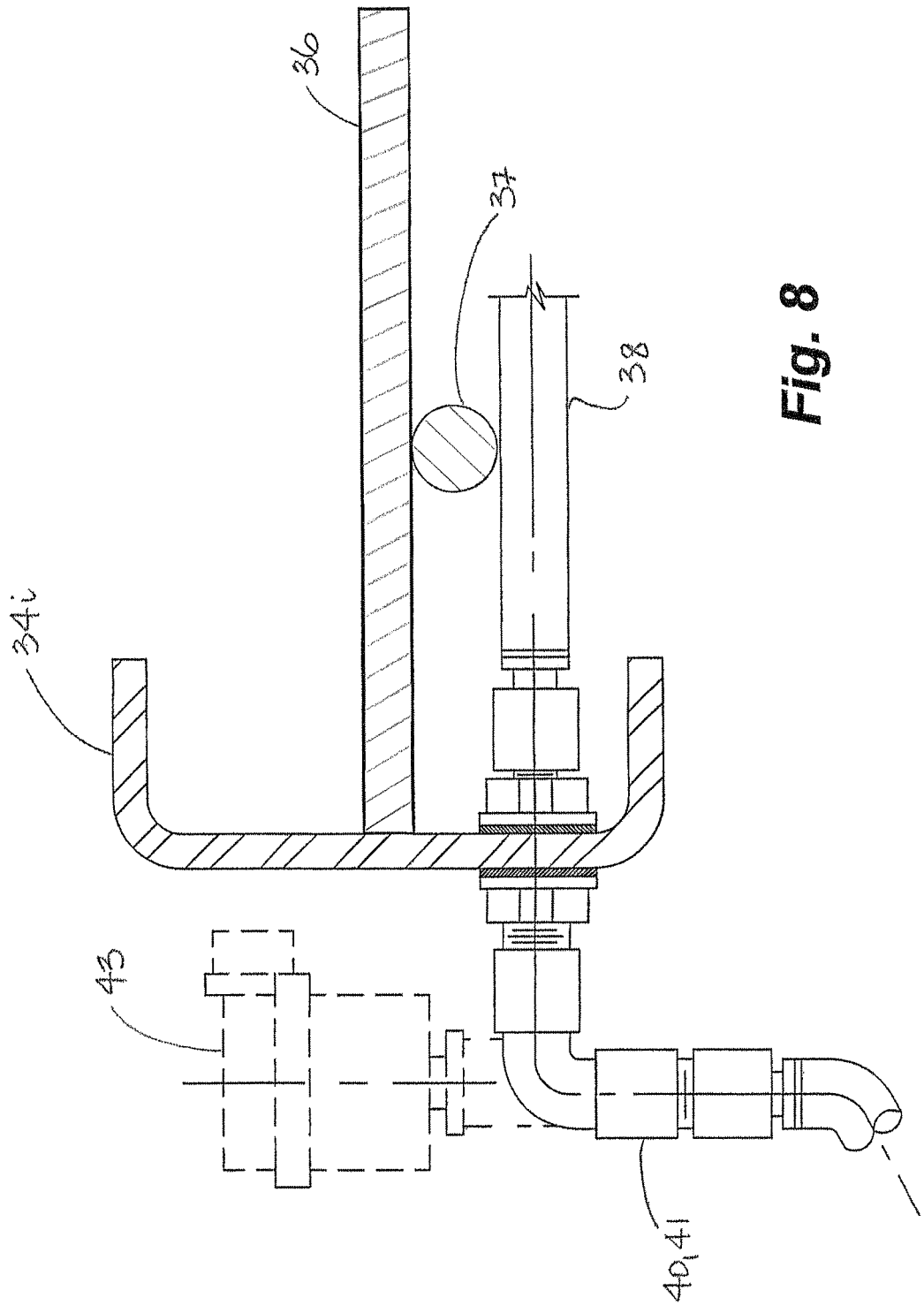
FIG. 8 is a detailed partial sectional view of the hydronic heating system of FIG. 6, illustrating a connection to a fluid supply and return headers.

As shown in FIGS. 1, 2A and 2B and in an embodiment of the invention, a carwash 1 comprises a wash tunnel 2 and at least one conveyance system 3 extending through the wash tunnel 2 and extending outside the wash tunnel 2 at an entrance 4, for loading vehicles outside the wash tunnel 2. In one embodiment, the car wash 1 comprises a main conveyor 5 installed inside the wash tunnel 2 and at least one additional conveyor which is at least partially exposed to the environment outside the wash tunnel 2. Applicant has described the conveyance system 3 herein as being an endless-belt conveyor. Applicant is aware of single and dual endless-belt conveyors for moving vehicles through at least a portion of a car manufacturing plant and in car wash environments.

In the embodiment shown, the additional conveyor is an entrance conveyor 6 which extends outwardly from the wash tunnel entrance 4, a first end 7 being adjacent to the inside main conveyor 5 and a second end 8 being outside the entrance 4 to a carwash tunnel 2. At least a portion of the entrance conveyor 6 is fully exposed to the elements. The entrance conveyor 6 operates to load a vehicle and transfer the vehicle to the main conveyor 5. The entrance conveyor 6 is typically stopped at the time of loading and the vehicle is driven onto the entrance conveyor 6 and placed in park or neutral. In embodiments of the invention however the vehicle may be loaded while the conveyor 6 is moving. Once the vehicle is positioned on the entrance conveyor 6, the entrance conveyor 6 is operated to achieve a speed synchronous with the speed of the inside main conveyor 5 and the vehicle is transferred to the inside main conveyor 5 for washing inside the wash tunnel 2.

Optionally, a third endless-belt conveyor or exit conveyor 9 is positioned at an exit 10 end of the main conveyor 5 and at least a portion of the exit conveyor 9 extends outside the wash tunnel 2 at an exit 11 from the wash tunnel 2. When the wash cycle is completed, the vehicle is transferred from the main conveyor 5 to the exit conveyor 9, at synchronized speed. The exit conveyor 9 is caused to come to a stop and the vehicle is then driven off.

Figure 12:
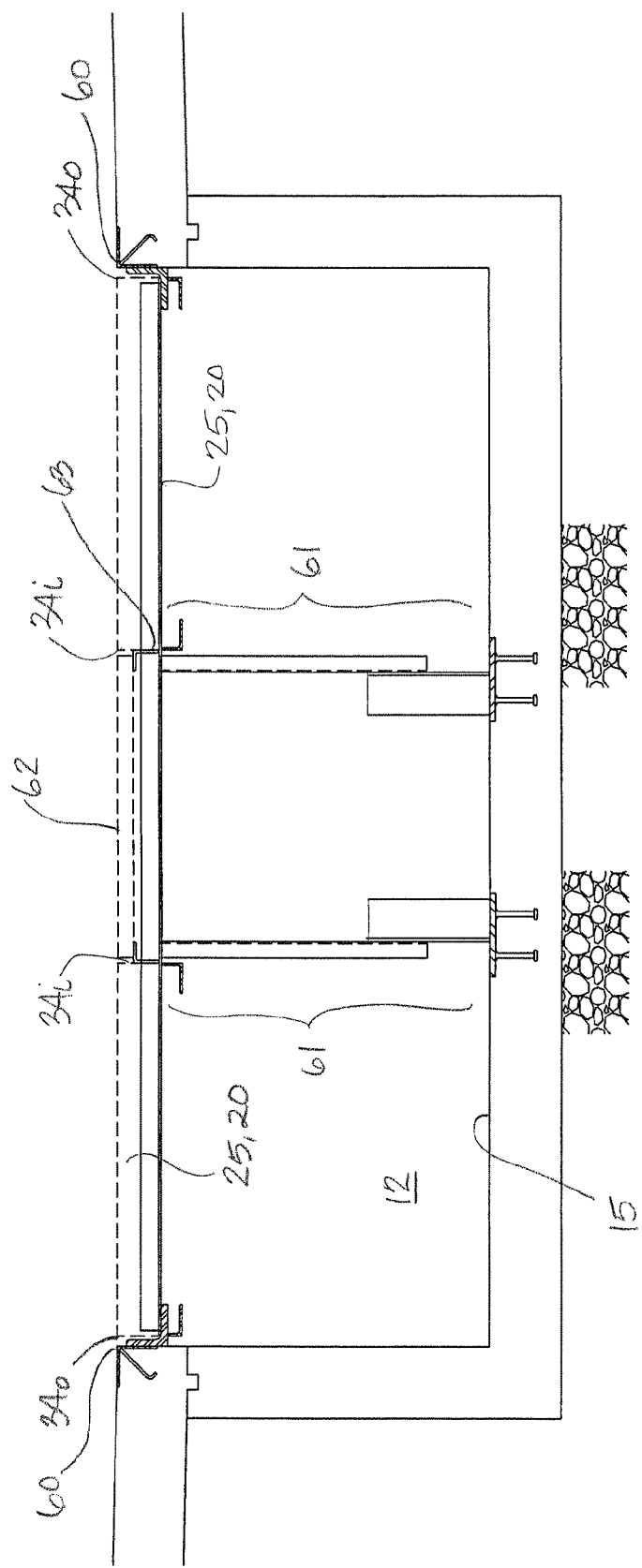
Figure 13:
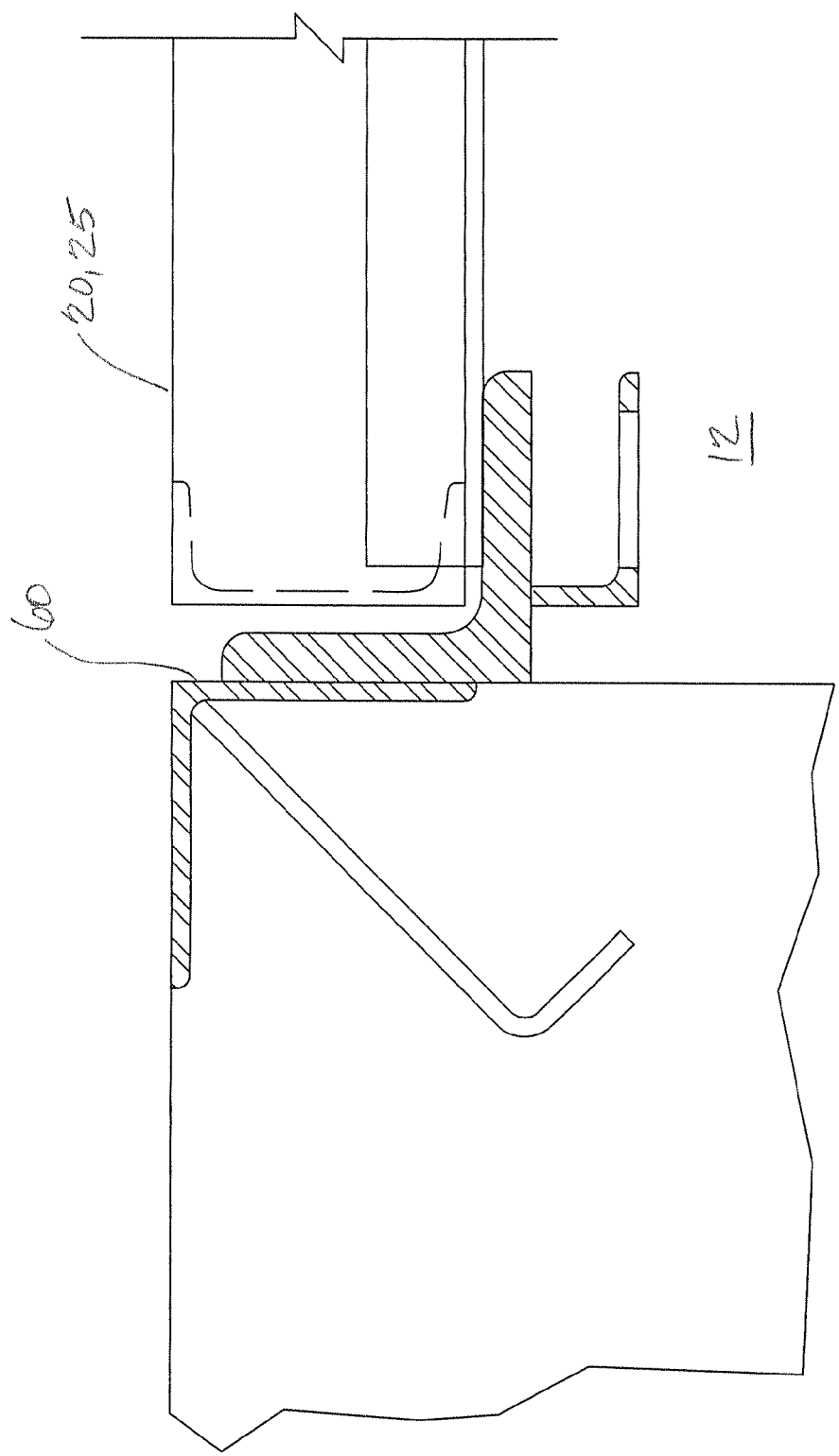
Figure 14:
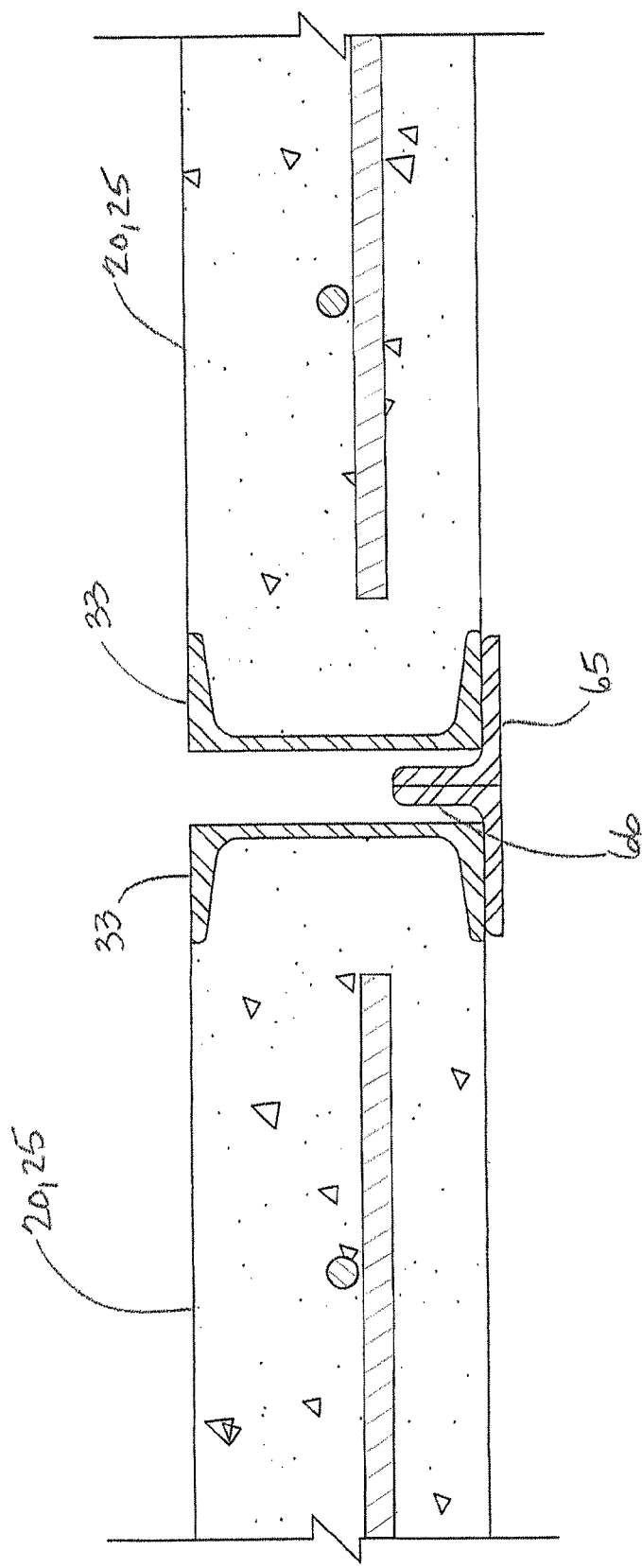

Having reference to FIGS. 3A-3B and 12-18B and in one embodiment, a trench 12 (FIGS. 3A and 3B) extends through the wash tunnel 2 and outside therefrom for receiving at least the main conveyor 5, the entrance conveyor 6 and the optional exit conveyor 9. As shown in FIGS. 12-14, the conveyors 5, 6 and 9 are installed inside the trench 12 using support legs 13 and a grid structure 14, which elevates the conveyors 5,6,9 sufficiently above a floor 15 of the trench 12 to permit operation thereof. As shown, the trench 12 accommodates conveyors 5,6,9 having spaced parallel belts 16. The belts 16 may be slat belts such as modular plastic belts or steel slat chains or other suitable heavy duty conveyor belts. Examples of suitable belts are UniCPB or UniXLB belts available from Uni Chains Manufacturing Inc. of Reading Pa., USA.

In one embodiment, as shown in FIGS. 3A and 3B, the floor 15 of the trench 12 is slanted so as to cause liquids therein to flow to a drain or plurality of drains (not shown), typically located inside the wash tunnel 2. In one embodiment the floor 15 of the trench 12 is slanted about 0.02 m/m.

In embodiments of the invention, a supporting substructure is provided to support the weight of the vehicle while it is conveyed through the car wash 1. Details of an embodiment of the supporting substructure are shown in FIGS. 12-18B. Particularly, replaceable modular concrete slabs 20, including heated slabs 25, are utilized to provide strength sufficient to support the vehicle while also providing thermal mass capable of transferring heat from a heating system to the conveyors 5,6,9 as required. As one of skill in the art would understand, a variety of support systems are possible to support the structural slabs 20,25 relative to a floor of the carwash and permit operation of the conveyance means used.

As shown in FIGS. 4 and 12, dual endless-belt conveyors 5,6,9 are used, each of the spaced, parallel belts 16 supporting wheels on one side of a vehicle for conveying the vehicle through the car wash. Structural pads or slabs 20, typically concrete, are installed between upper and lower portions 21,22 of each of the endless belts 16, the upper portion 21 of the endless belt 16 operating in sliding contact with an upper surface 23 of the structural slabs 20 when a vehicle is loaded on the conveyors 5,6,9. Steel plates 19 may be used on the upper surface 23 of the slabs 20 to reduce friction between the upper portion 21 of the endless belt 16 and the slabs 20,25. Further, water is typically introduced between the upper surface 23 of the slabs 20 or the steel plates 19 and the endless belt 16 to ensure adequate lubrication therebetween. The heated structural slabs 25 may be heated according to embodiments of the invention particularly when used for the entrance and exit conveyors 6, 9 and may also be used to heat the main conveyor 5 adjacent the entrance 4 and optionally, the exit 11.

Having reference to FIGS. 1-11, and in the case of the entrance conveyor 6, the entrance conveyor 6 is installed in a portion 24 of the trench 12 which extends outwards from the wash tunnel entrance 4. Heated structural slabs 25, similar to the un-heated structural slabs 20 used in the wash tunnel 2, are positioned adjacent the entrance conveyor 6. The heated slabs 25 are provided with heating means 26 to prevent water, snow and the like from freezing and hindering operation of the entrance conveyor 6. The heated slabs 25 are similarly supported over the floor 15 of the entrance trench 12 and between the upper and lower portions 21,22 of the endless belts 16 of the entrance conveyor 6. In one embodiment, the heated slabs 25 are suspended using a plurality of support members extending between the slabs 25 and the trench 12. Other such suitable support members which engage and suspend the slabs 25 may be used.

Similarly, the optional exit conveyor 9, which may be installed in a portion 27 of the trench 12 extending outwardly from the exit 11 of the wash tunnel 2, is also freeze-protected using heated concrete slabs 25 which are installed in the trench 12 as for the entrance conveyor 6.

In one embodiment, best seen in FIGS. 1 and 2A-2B, additional heated concrete slabs 25 are installed inside the wash tunnel 2 adjacent the entrance 4 and the exit 11 and contiguous with the entrance and exit conveyors 6,9 to ensure the conveyors 6,9 are protected from freezing inside the wash tunnel 2 when exposed to freezing temperatures adjacent the entrance and the exit 4,11 of the wash tunnel 2. In this embodiment, motors and apparatus used to drive the entrance conveyor 6 and the main conveyor 5 are typically positioned within the wash tunnel 2 adjacent the entrance and exit 4,11 of the wash tunnel 2 to limit exposure to extreme ambient temperatures.

In one embodiment, best seen in FIGS. 5, 7A-7C and 10, the concrete slabs 20, 25 comprise a frame 31 in which a support grid 32 is formed. The frame 31 and support grid 32 provide sufficient structural strength and rigidity for supporting concrete 35 therein and the weight of the vehicle thereon. In one embodiment the frame 31 comprises end and side channels 33,34, inside which the support grid 32 of transverse and longitudinal members 36,37 is supported. In one embodiment, the transverse and longitudinal members 36,37 are rebar having corrosion resistant protection, such as stainless steel, epoxy coating or hot-dip galvanizing.

Having reference to FIGS. 2A-2B, 5-8 and FIGS. 10-11, and in one embodiment, a hydronic system 30 is used for circulating a heated fluid therethrough as the means for heating the heated concrete slabs 25. Hydronic loops of tubing 38, such as ½" cross-linked polyethylene tubing (PEX), for example hePEX™ available from Wirsbo Company of Apple Valley Minn., 55124, USA, are laid in the frame 31 and supported by the grid structure 32. Alternately, the tubing loops 38 can be formed using fittings 39, such as tees and elbows, to create a fluidly connected grid of tubing in the frame 31. An inlet 40 and an outlet 41 are connected to opposing ends of the fluidly connected tubing 38 and are supported in the frame 31. Concrete is poured into the frame 31 forming a concrete core 35 surrounding the support grid 32 and loops of tubing 38 and is allowed to set.

In one embodiment, the heated concrete slabs 25 are about 4 inches thick. The hydronic tubing loops 38 are positioned at about 1½ inches from the surface 23 of the heated slab 25 and the tubing loops 38 are tied to the grid structure 35 using plastic wire ties. The concrete core 35 used can be 35 MPa Class C1 with ⅜' aggregate mix designed to withstand both high and low temperatures and chloride attack from commonly used deicing chemicals. In this embodiment, the hydronic tubing 38 is installed in a reverse-return loop system so as to obtain an even distribution of heat over substantially the entire surface of the heated concrete slab 25.

Once installed, best seen in FIG. 2B, the inlets 40 of the heated concrete slabs 25 are connected through supply lines S to a supply of heated fluid, such as hot water or glycol. The outlets 41 are connected to return lines R which returns the fluid to the heater system for repeated recycling through the heated slabs 25. In one embodiment, each of the outlets 41 are fit with an optional air vent 43 used to bleed air out of the tubing lines 38 when the fluid, such as glycol, is introduced.

Heat from the fluid flowing through the tubes 38 is transferred to the concrete 35, a thermally conductive material, which acts as thermal mass to radiate heat for preventing freezing of water between the heated slabs 25, the conveyor belts 16 and in the area of the trench 12.

Figure 9:
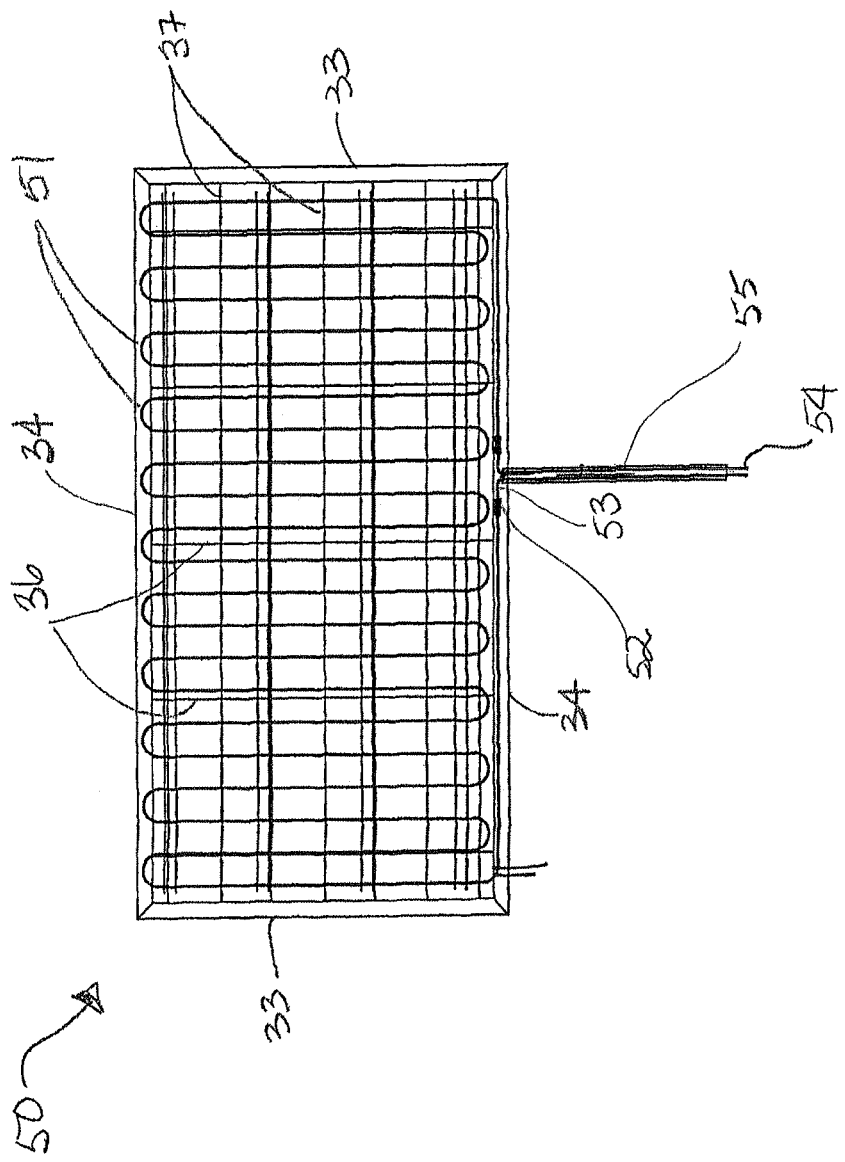
FIG. 9 is a plan view of an electric heating system according to an embodiment of the invention.
Figure 10:
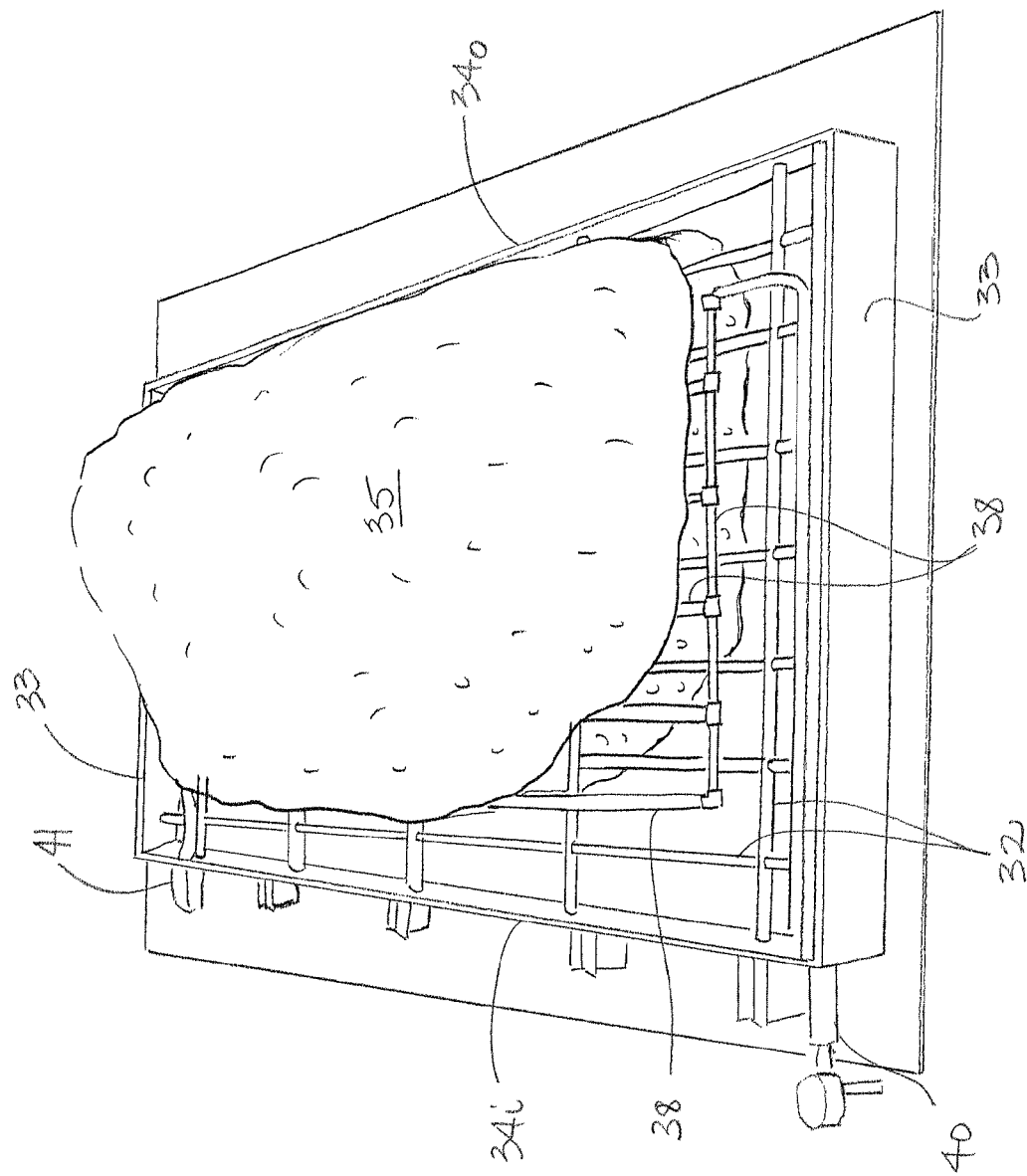
FIG. 10 is a perspective view according to FIG. 5, concrete being added to the frame and tubing as shown in FIG. 6 for forming the heated slabs.
Figure 11:
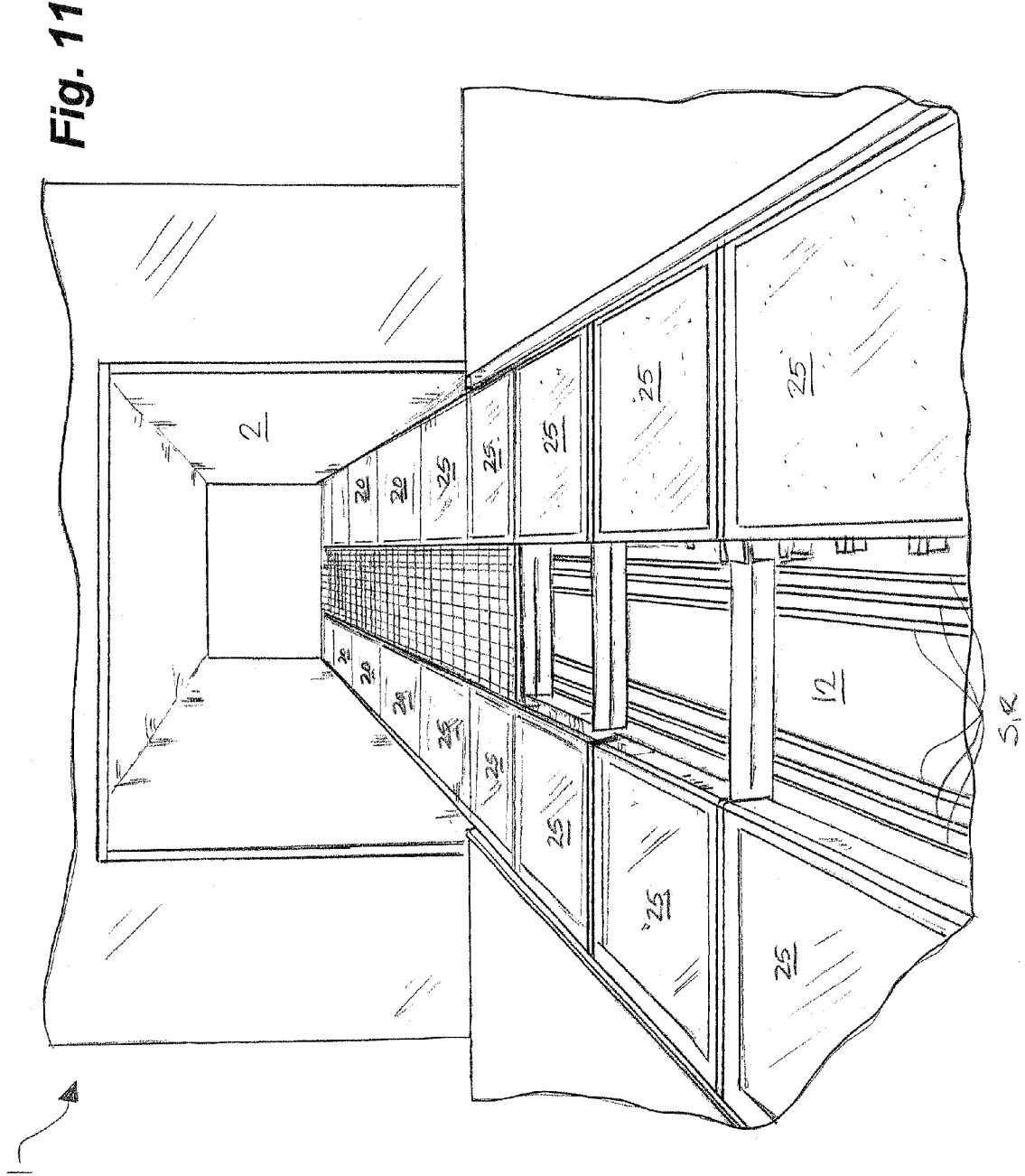
FIG. 11 is a perspective view of a plurality of heated slabs installed for use at an entrance conveyor of a carwash according to an embodiment of the invention.

In one embodiment, as shown in FIGS. 9 and 18A-18B, the means for heating the concrete slabs 25 is an electric heating system 50. A heating pad or mat 51 of heating wire is embedded in the heated concrete slab 25 and is connected to a 240 V supply. One such heating system is the Easy-Heat Sno*Melter® Mat #GO10X36-240-50 series available from Easy Heat Inc. of 20 East New Carlisle, Ind., 46552, USA. The mat 51 is fit to the dimensions of the slab 25, is placed in the frame 31 and tied to the grid structure 35 after which the concrete is poured into the frame 31, embedding the mat 51 in the concrete. A hot-cold joint 52 is installed between a heating lead 53 and a cold lead 54 connected to the mat 51. The cold lead 54 extends through a fiberglass composite conduit 55 and extends about 6 inches beyond the slab 25 for connection to the electrical supply. One suitable fiberglass composite conduit 55 is a ½ inch diameter conduit available from Fre Composites, St. Andre-d'Argenteuil, Quebec, Canada.

In an embodiment shown in FIGS. 12-18B, the structural slabs 20,25 over which the endless belts 16 of the conveyors 5,6,9 move, are spaced apart in parallel arrangement sufficient to support the wheels on each side of a wide variety of vehicles thereon. As shown in FIGS. 12 and 13, each of the spaced parallel slabs 20, 25 are supported at an outside side channel 34o of the frame 31 at an upper edge 60 of the trench 12 and at an inside side channel 34i of the frame 31 by support members 61 which extend upwardly from the trench floor 15. In one embodiment, the slabs 20, 25 are supported at substantially the height of the floor of the wash tunnel 2 for providing a contiguous height of flooring throughout.

Figure 17:
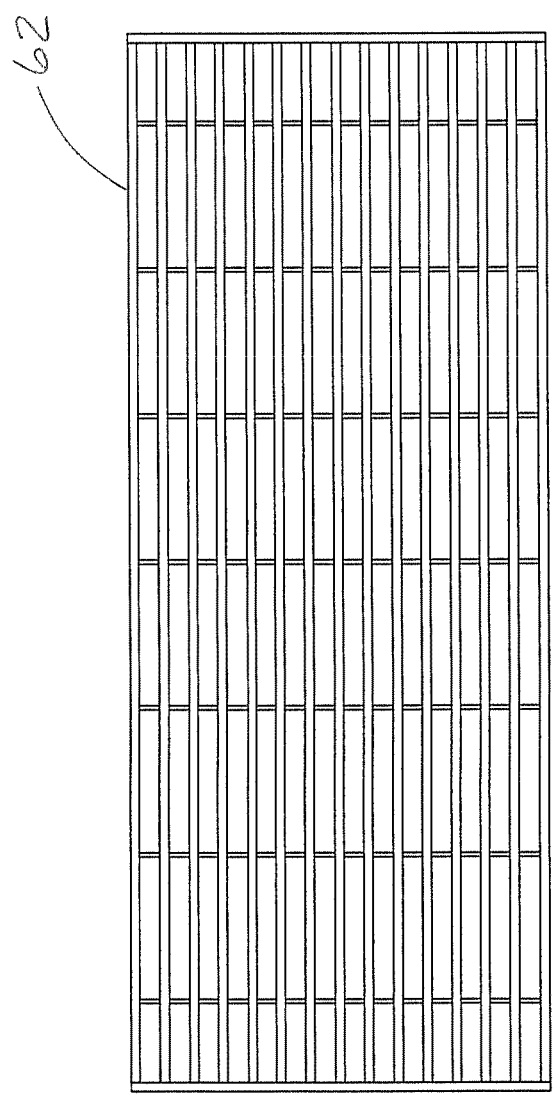

Further, open removable gratings 62, best seen in FIGS. 12 and 17, are supported between the spaced parallel structural slabs 20, 25 by channel members 63 which extend along the inside side channels 34i of the slab frames 31. Dowels 64 assist in securing the gratings 62 between the structural slabs 20,25. The open removable gratings 62 permit fluid to flow therethrough to the trench 12. Further the removeable gratings 62 permit access to the trench 12 and to the conveyor drive means and connections for the heating means 26 to facilitate maintenance and replacement.

As shown in FIG. 14, the end channels 33 of adjacent slabs 20, 25 are supported by transversely extending T-shaped channels 65, a portion 66 of which extends upwardly between the adjacent slabs 20, 25.

Having reference to FIGS. 16A-16C, checker plates 70 having hand holes 71 to permit easy removal of the gratings 62 for access to the trench 12 are provided in lieu of the grating 62 intermediate the structural slabs 20,25 exterior to the building.

As shown in FIG. 12 and in an embodiment of the invention, the trench is approximately 2.6 m in width. Each of the slabs are about 0.9 m in width and the grating secured therebetween is about 0.7 m in width. A typical slab 20,25 can be about 1.8 m in length from end to end.

The embodiments of the invention in which an exclusive property or privilege is claimed are defined as follows:

1. In a carwash exposed to low ambient temperatures, a system for conveying vehicle, the system comprising:
    at least one conveyor for moving the vehicle through the carwash, at least a portion of the conveyor being exposed to the low ambient temperatures; and
    a heated structural slab supporting at least a moving portion of the at least one conveyor and in sliding contact with the conveyor to cause heat to be transferred to the conveyor for preventing fluid at the conveyor from freezing.

2. The system of claim 1 wherein the conveyor is an endless-belt conveyor comprising:
    an upper belt portion; and
    a lower belt portion; and
    wherein the heated structural slab is positioned between the upper belt portion and the lower belt portion and supports the upper belt portion for movement thereal-ong.

3. The system of claim 2 comprising two said conveyors and two said heated structural slabs, both said conveyors being endless belts and being spaced apart in parallel arrangement adapted for supporting wheels of a vehicle; and said heated structural slabs being spaced apart in parallel arrangement such that each slab supports, and is in sliding contact with, one of said endless belts.

4. The system of claim 2 wherein the upper belt portion is operably configured to receive a fluid introduced between the upper belt portion and the heated structural slab.

5. The system of claim 1 further comprising a hydronic system for heating the structural slab.

6. The system of claim 1 further comprising an electronic heat mat for heating the structural slab.

7. The system of claim 1 wherein the structural slab is supported above a floor of the carwash.

8. The system of claim 1 wherein at least a portion of the conveyor is positioned within a trench in a floor of the carwash, the structural slab being supported above a bottom of the trench.

9. The system of claim 1 wherein the conveyor comprises:
    a main conveyor positioned within a carwash tunnel; and
    an entrance conveyor extending outwards from an entrance of the carwash tunnel, a portion of which is exposed to low ambient temperatures,
    wherein the heated structural slab supports at least the entrance conveyor.

10. The system of claim 9 further comprising:
    an exit conveyor extending outwards from an exit of the carwash tunnel, a portion of which is exposed to low ambient temperatures,
    wherein the heated structural slab supports the exit conveyor.

11. The system of claim 9 wherein the heated structural slab supports the main conveyor adjacent the entrance of the carwash tunnel.

12. The system of claim 9 wherein the heated structural slab supports the main conveyor adjacent the exit of the carwash tunnel.

13. The system of claim 5 wherein the hydronic system comprises:
    a plurality of fluidly connected loops of tubing formed within the structural slab;
    an inlet to the plurality of loops; and
    an outlet from the plurality of loops,
    wherein a heated fluid is flowed through the plurality of loops from the inlet to the outlet for transferring heat to the structural slab.

14. The system of claim 13 wherein the heated fluid is glycol.

15. The system of claim 13 wherein the structural slab comprises:
    a frame having a plurality of grid members formed within the frame upon which the plurality of fluidly connected loops of tubing are supported; and
    a concrete core for accepting heat from the heated fluid for heating the structural slab for transferring heat therefrom.

16. The system of claim 15 wherein the plurality of fluidly connected loops of tubing are embedded in the concrete core adjacent a top surface of the structural slab.

17. The system of claim 16 further comprising a metal plate disposed between the structural slab and the conveyor.

* * * * *